(No Model.)
J. W. GAMBLE.
DRAFT EQUALIZER.
No. 445,638. Patented Feb. 3, 1891.
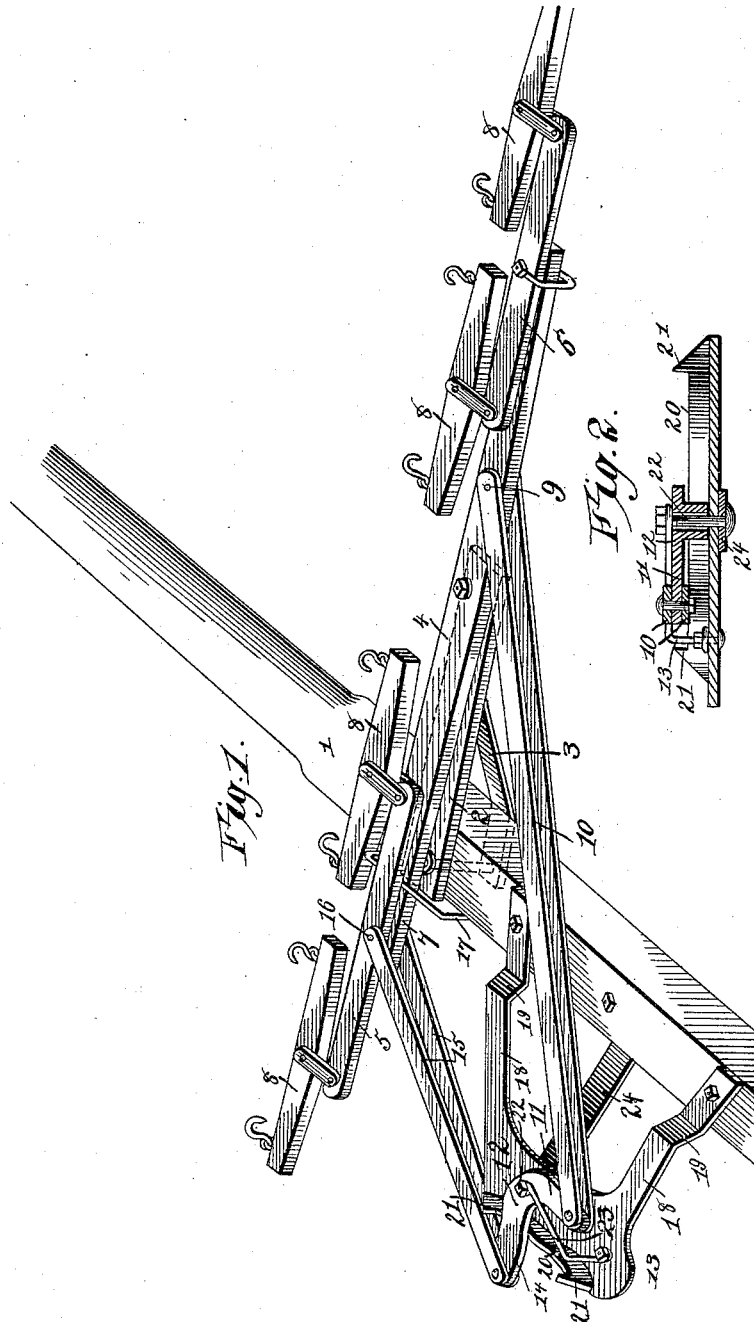
Witnesses
H. G. Dieterich
H. F. Riley
Inventor
Joseph W. Gamble,
By his Attorneys,
C. A. Snow & Co.

UNITED STATES PATENT OFFICE.

JOSEPH W. GAMBLE, OF ADAIR, IOWA.

DRAFT-EQUALIZER.

SPECIFICATION forming part of Letters Patent No. 445,638, dated February 3, 1891.

Application filed November 1, 1890. Serial No. 370,017. (No model.)

*To all whom it may concern:*

Be it known that I, JOSEPH W. GAMBLE, a citizen of the United States, residing at Adair, in the county of Adair and State of Iowa, have invented a new and useful Draft-Evener, of which the following is a specification.

The invention has relation to improvements in draft-eveners.

The object of the present invention is to simplify and improve the construction of draft-eveners and increase their strength and durability.

The invention consists in the construction and novel combination and arrangement of parts hereinafter fully described, illustrated in the accompanying drawings, and pointed out in the claims hereto appended.

In the drawings, Figure 1 is a perspective view of a draft-evener constructed in accordance with this invention. Fig. 2 is a transverse sectional view taken through the pivot of the bell-crank lever.

Referring to the accompanying drawings, 1 designates a tongue having pivotally connected to it one end of a bracket-bar 2, the other end of which is supported by a brace 3, and has pivoted to it a main whiffletree 4, which is pivoted beyond its center and has connected to its ends a pair of doubletrees 5 and 6, and is arranged so that its end 7 projects slightly on one side of the tongue, whereby the doubletree 5 has one of its singletrees 8 arranged on each side of the tongue, thereby bringing three horses on one side of the tongue and one on the other. The main whiffletree is connected near its outer end at a point beyond its center by a pivot 9 with the front ends of a pair of long bars 10, which have their front ends arranged on the upper and lower faces of the main whiffletree and which extend rearwardly and have their rear ends pivotally connected to the short arm 11 of a bell-crank lever 12. The bell-crank lever 12 is fulcrumed at its angle on a bracket 13 and has its long arm 14 connected by short bars 15 with the center of the doubletree 5, which is pivotally attached to the end 7 of the main whiffletree, and the pivot 16 which secures the doubletree 5 to the main whiffletree also serves to secure the short bars 15, which are similar to the long bars 10, and have their forward ends arranged on the upper face of the doubletree and the lower face of the main whiffletree. It will thus be seen that the long arm of the main whiffletree is connected with the short arm of the bell-crank lever, and the short arm of the main whiffletree is connected with the long arm of the bell-crank lever, thereby equalizing the draft.

The brace 3 is pivoted to the tongue and to the bracket-bar, and the end 7 of the main whiffletree is arranged in a keeper 17, which has its ends secured to the sides of the tongue and is arranged between the main whiffletree and the doubletree 5 and separates the same.

The bracket 13 upon which the bell-crank lever is fulcrumed is angular, and has its arms 18 secured to the upper face of the tongue and bent, as at 19, to elevate the outer portion of the bracket above the plane of the tongue, and the angle of the bracket projecting toward the grain about one inch, or as far as the case may require, is provided with a vertical flange 20, having at its ends shoulders 21, and the long arm of the bell-crank lever is arranged between the shoulders 21 and is limited in its movement by them. The pivot 22, which fulcrums the bell-crank lever to the bracket, has its upper end supported by a brace-rod 23, the other end of which is secured to the bracket, and the said brace-rod prevents the pivot being torn from the bracket should great force be exerted upon the device. The outer portion of the bracket is supported by a stationary brace 24, having one end secured to the tongue and the other end secured to the lower face of the bracket by the pivot 22.

It will readily be seen that the draft-evener is simple and inexpensive in construction and is capable of standing great strain without injury to its parts.

What I claim is—

1. In the improved draft-evener, the combination of the tongue, the angle-bracket secured to the tongue and having its outer portion provided with a vertical flange and having the shoulders arranged at the ends of the flange, the bell-crank lever having its long arm arranged between the said shoulders, the brace-rod 23, secured to the bracket and connected with the pivot of the bell-crank lever and supporting the same, the bracket-bar, the main whiffletree pivoted to the bracket-bar and connected with the bell-crank lever and having whiffletrees at its ends, substantially as described.

2. In the improved draft-evener, the combination of the tongue, the angle-bracket having its arms bent at 19 and secured to the tongue and provided at its outer end with the shoulders 21, the stationary brace 24, secured to the tongue and the outer end of the bracket, the bell-crank lever fulcrumed on the bracket and having its long arm arranged between the said shoulders 21, the bracket-bar, the main whiffletree pivoted to the bracket-bar at a point beyond its center and having its long arm connected with the short arm of the bell-crank lever and its short arm connected with the long arm of the bell-crank lever, the keeper secured to the tongue and inclosing the main whiffletree, the doubletree 6, secured to the outer end of the main whiffletree, and the doubletree 5, secured to the inner end of the main whiffletree and having one of its singletrees arranged on each side of the tongue, substantially as described.

In testimony that I claim the foregoing as my own I have hereto affixed my signature in presence of two witnesses.

JOSEPH W. GAMBLE.

Witnesses:
   E. D. PORTER,
   W. F. WILLIAMS.